(12) United States Patent
Kanao et al.

(10) Patent No.: US 6,594,075 B1
(45) Date of Patent: Jul. 15, 2003

(54) MICROSCOPE WITH ELECTRONIC IMAGE SENSOR

(75) Inventors: Masato Kanao, Hachioji (JP); Gakuji Higuchi, Ina (JP); Atsushi Yonetani, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/722,993

(22) Filed: Nov. 27, 2000

(30) Foreign Application Priority Data

Nov. 29, 1999 (JP) .......................................... 11-338424
Nov. 20, 2000 (JP) ...................................... 2000-353147

(51) Int. Cl.[7] .............................................. G02B 21/00
(52) U.S. Cl. ......................... 359/385; 359/368; 348/80
(58) Field of Search ................................. 359/362, 363, 359/369, 368, 384, 385, 387, 389

(56) References Cited

U.S. PATENT DOCUMENTS

| | | | | |
|---|---|---|---|---|
| 3,656,829 A | * | 4/1972 | Wilms ........................ | 351/205 |
| 4,361,377 A | * | 11/1982 | Pullen ........................ | 359/385 |
| 4,852,985 A | * | 8/1989 | Fujihara et al. ............. | 359/387 |
| 5,481,401 A | * | 1/1996 | Kita et al. .................. | 359/353 |
| 5,708,892 A | * | 1/1998 | Kon ........................... | 396/452 |
| 6,219,181 B1 | * | 4/2001 | Yoneyama et al. .......... | 359/368 |
| 6,452,625 B1 | * | 9/2002 | Kapitza ....................... | 348/80 |

FOREIGN PATENT DOCUMENTS

| | | |
|---|---|---|
| JP | 3-96614 | 10/1991 |
| JP | 10-333055 | 12/1998 |
| JP | 10-339845 | 12/1998 |
| JP | 11-264941 | 9/1999 |

* cited by examiner

Primary Examiner—Thong Nguyen
Assistant Examiner—Jesse Rowe
(74) Attorney, Agent, or Firm—Frishauf, Holtz, Goodman & Chick, P.C.

(57) ABSTRACT

A microscope includes a column which stands upright on a base, an LED light source, a stage for placing a specimen irradiated with light from the LED light source, a lens barrel which is arranged to face the specimen on the stage, and has an observation optical system for acquiring the observation image of the specimen, an image sensing element which is arranged at the imaging position of the observation optical system of the lens barrel, and senses the observation image of the specimen, a monitor for displaying the observation image sensed by the image sensing element, and a recording unit for recording image data of the observation image sensed by the image sensing element. At least the LED light source, stage, observation optical system, and image sensing element are arranged along the optical axis of the observation optical system, and supported along the column.

9 Claims, 11 Drawing Sheets

MICROSCOPE WITH ELECTRONIC IMAGE SENSOR

CROSS-REFERENCE TO RELATED APPLICATIONS

This application is based upon and claims the benefit of priority from the prior Japanese Patent Applications No. 11-338424, Nov. 29, 1999; and No. 2000-353147, Nov. 20, 2000, the entire contents of which are incorporated by reference.

BACKGROUND OF THE INVENTION

The present invention relates to a microscope for sensing an image by an image sensing element.

Recently, demands have arisen for compact, space-saving microscopes which facilitate observation and operation. A known example of such a microscope is disclosed in Jpn. UM Appln. KOKAI Publication No. 3-96614 in which an illumination lamp is arranged at a lower portion of a microscope base, and a preparation holder, objective lens, and eyepiece lens are aligned along the optical axis above the illumination lamp to make it possible to observe, via the objective lens and eyepiece lens, a specimen image obtained through a preparation by transmission light from the illumination lamp.

In the microscope having this arrangement, a specimen image is observed via the eyepiece lens. The observer must look through the eyepiece lens every time he/she observes the specimen, and the motion is cumbersome.

To solve this problem, a microscope which displays a specimen image on an observation monitor is recently proposed. Jpn. Pat. Appln. KOKAI Publication No. 10-339845 discloses an example of such a microscope in which transmission light from a light source irradiates a specimen on a stage, a specimen image obtained through the specimen is formed on the image sensing surface of a TV camera via an objective lens, and the sensed image is displayed on a TV monitor.

In recent years, digital photographs are more frequently used even in the microscopic field along with the development of digital techniques. Compared to a silver halide photograph, a digital photograph can be easily taken without developing it, and left as data in a personal computer. The digital photograph does not degrade and require any space, unlike a negative.

In many cases, digital photographs were lower in image quality than silver halide photographs, and were hardly used. However, the development of image sensing elements (CCDs) has improved the image quality of digital photographs to be almost equal to that of silver halide photographs. Digital photographs are considered to be more popular in the future.

Various microscopes having image sensing elements have recently been proposed. An example of such a microscope is disclosed in Jpn. Pat. Appln. KOKAI Publication No. 11-264941 or 10-333055 in which a digital camera is connected to a conventional microscope, or an eyepiece lens is omitted to downsize a microscope.

In general, an image sensing element senses an image by accumulating or transferring (reading) charges. Most of the above-described digital microscopes control exposure only by an electronic shutter method of switching energization of an image sensing element and changing the exposure time. When a bright object is photographed, the image is exposed even during a short time while charges are read out from pixels, thus causing a smear that the object image is taken as if the object drew a stripe.

When the read method of the image sensing element is interlaced scanning, an image blurs or suffers misregistration due to the difference in read between scan lines.

For this reason, sometimes a high-quality image cannot be photographed (recorded).

In general, to solve this problem in the field of digital cameras, known techniques propose various digital cameras in which a shutter mechanism for physically shielding incident light on an image sensing element during charge read is arranged in front of the image sensing element.

However, in the above-mentioned microscope having an external TV camera and TV monitor, the TV camera and TV monitor are installed outside the microscope main body to make the whole apparatus bulky. This microscope has room for improvement in terms of downsizing and space reduction.

If this digital camera is connected to a microscope disclosed in Jpn. Pat. Appln. KOKAI Publication No. 11-264941, or a mechanical shutter mechanism is installed in front of the image sensing element of a microscope disclosed in Jpn. Pat. Appln. KOKAI Publication No. 10-333055, the above problem is solved, and an image improved in quality can be sensed (recorded).

In the microscope in which the shutter mechanism is installed in front of the image sensing element, the shutter mechanism is arranged on an imaging optical system. If the shutter mechanism is arranged on the imaging optical system, attention must be paid to deposition or entry of dust to the imaging optical system in assembly, and assembly requires a long time to increase the cost.

When the mechanical shutter is used as a shutter mechanism, the mechanical shutter mechanism is driven at a high speed to generate dust such as wear powder. This dust is deposited on a lens on the imaging optical system to degrade a photographed image.

As the resolution of the image sensing element increases in the future, these problems become more serious, and cause fatal defects particularly in the microscopic field in which a high-resolution image is required.

BRIEF SUMMARY OF THE INVENTION

The present invention has been made in consideration of the above situation, and has as its object to provide a compact, space-saving microscope which facilitates observation and operation.

The present invention has been made in consideration of the above situation, and has as another object to provide a low-cost microscope capable of photographing a high-quality image without any image degradation or any assembly problem caused by arranging a shutter mechanism on an imaging optical system.

The first invention is characterized by comprising an LED light source, a stage for placing a specimen irradiated with light from the LED light source, a lens barrel which is arranged to face the specimen on the stage, and has an observation optical system for acquiring an observation image of the specimen, an image sensing element which is arranged at an imaging position of the observation optical system of the lens barrel, and senses the observation image of the specimen, an electrical processing unit for processing an output signal from the image sensing element, a monitor for displaying image data of the observation image output from the electrical processing unit, and recording means for recording the image data of the observation image, wherein the LED light source, the stage, the lens barrel, and the image sensing element are linearly aligned, and the electrical processing unit is arranged behind the lens barrel.

The second invention according to the first invention is characterized in that the second invention further comprises a support member which stands almost upright, and the LED light source, the stage, the lens barrel, and the image sensing element are supported along the support member.

The third invention is a transmission illumination microscope characterized by comprising a light source, a stage for placing a specimen irradiated with illumination light from the light source, an imaging optical system which is arranged to face the specimen on the stage, and acquires an observation image of the specimen, an image sensing element arranged at an imaging position of the imaging optical system, a control unit for controlling the image sensing element, and a shutter mechanism which is arranged between the light source and the stage, and shields incident light on the image sensing element in synchronism with an image sensing timing of the image sensing element controlled by the control unit.

The fourth invention is a coaxial incident-light illumination microscope characterized by comprising a light source, a stage for placing a specimen irradiated with illumination light from the light source, an imaging optical system which is arranged to face the specimen on the stage, and acquires an observation image of the specimen, an image sensing element arranged at an imaging position of the imaging optical system, a control unit for controlling the image sensing element, a semi-transmission reflecting member for irradiating the specimen with illumination light from the light source coaxially with the observation optical system, a light-transmitting dustproof member interposed between the light source and the semi-transmission reflecting member, and a shutter mechanism which is arranged between the light source and the light-transmitting dustproof member, and shields incident light on the image sensing element in synchronism with an image sensing timing of the image sensing element controlled by the control unit.

According to the first invention, the observation image of the specimen can be observed on the monitor, so that specimen observation and its operation can be facilitated. The LED light source, stage, lens barrel, and image sensing element are aligned, and the electrical processing unit is arranged behind the lens barrel. This can downsize the overall microscope.

According to the second invention, the LED light source, stage, lens barrel, and image sensing element are arranged along the support member which stands almost upright, which can further downsize the overall microscope.

According to the third and fourth inventions, an assembly problem caused by arranging the shutter mechanism on the imaging optical system does not arise, and dust such as wear powder generated from the shutter mechanism or the like does not deposit on the imaging optical system. Thus, an apparatus capable of photographing a high-quality image can be provided at a low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the several views of the accompanying drawing.

First Embodiment

Figure 1:
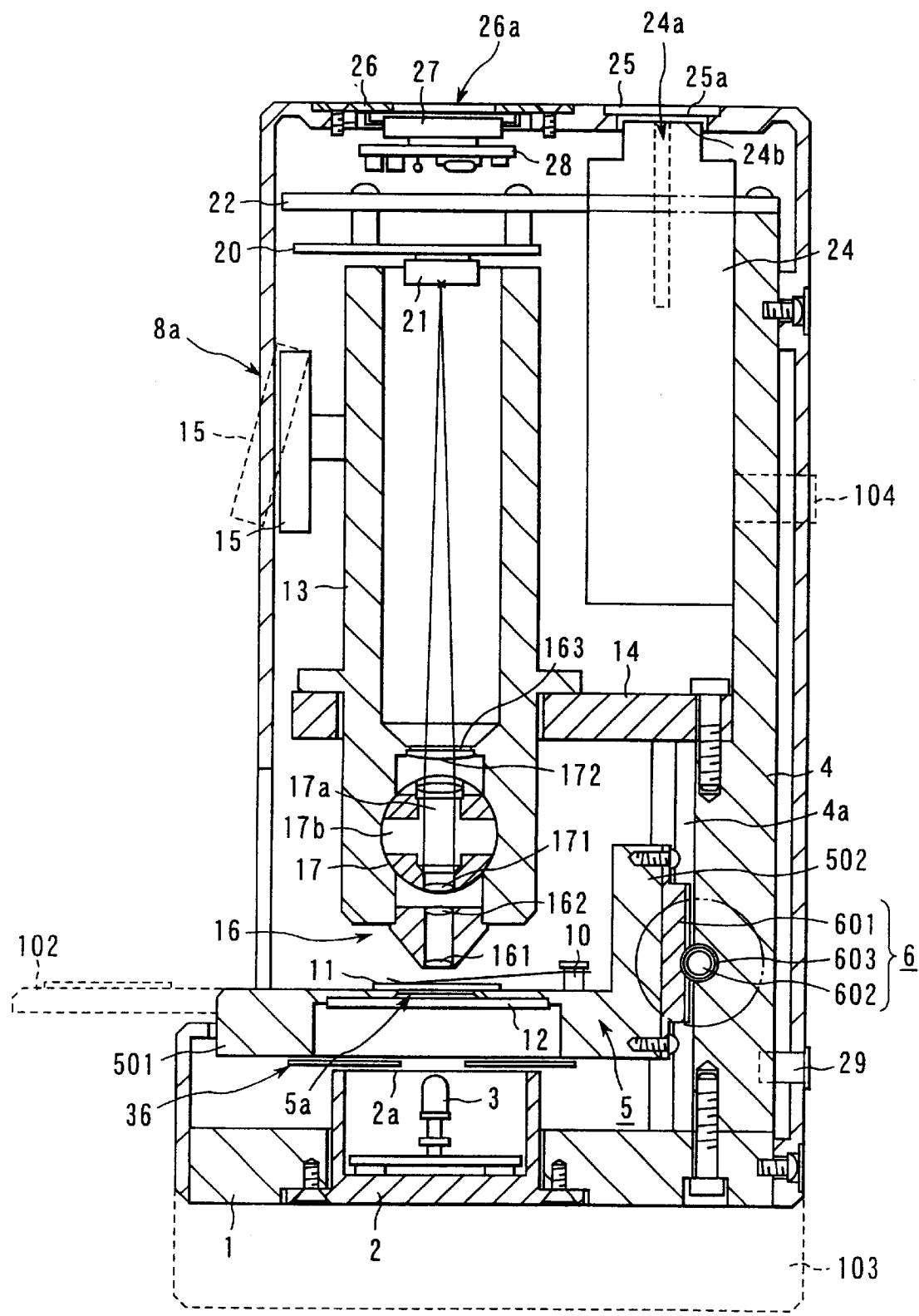
FIG. 1 is a side view showing the schematic arrangement of the first embodiment of the present invention.
Figure 2:
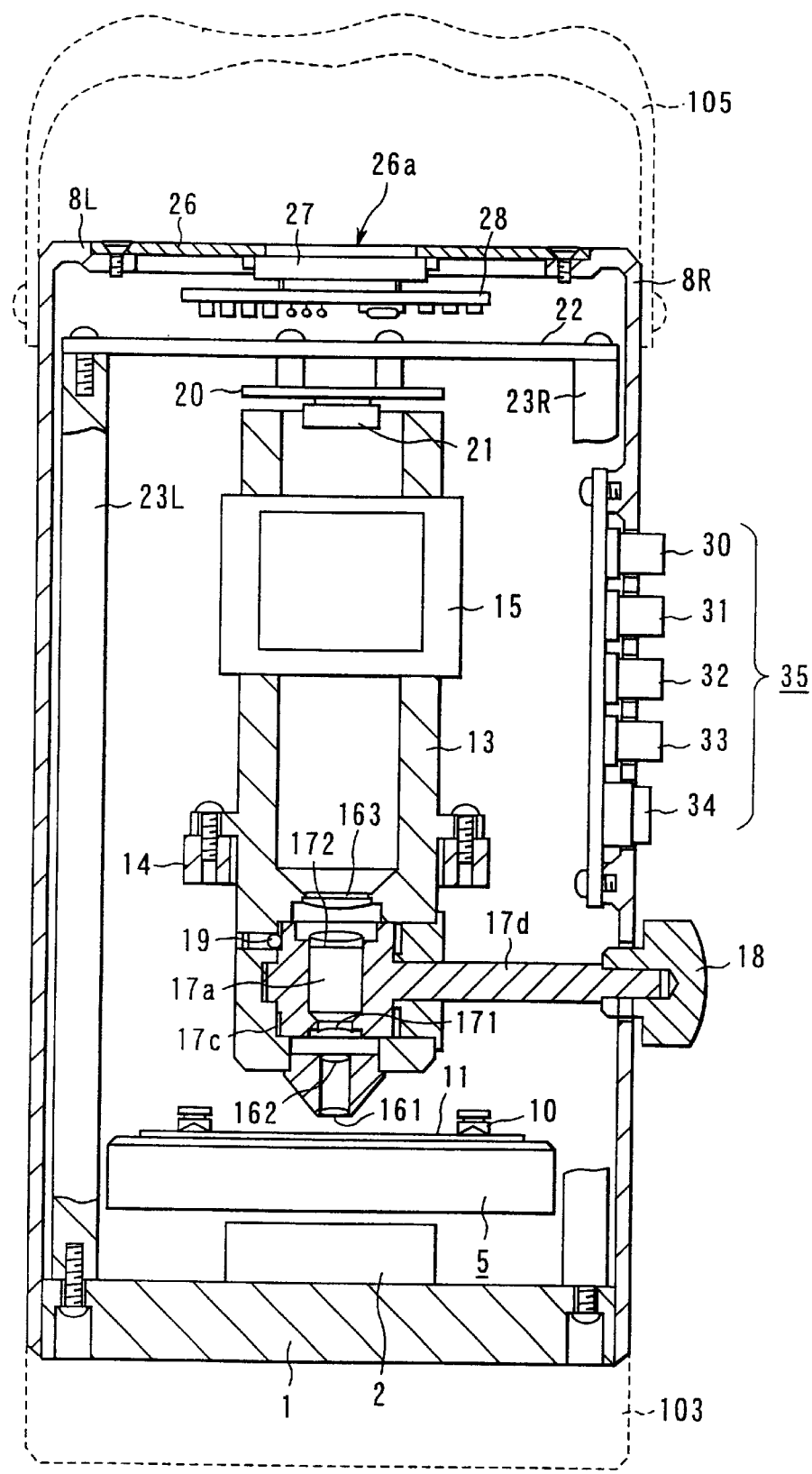
FIG. 2 is a front view showing the schematic arrangement of the first embodiment.
Figure 3:
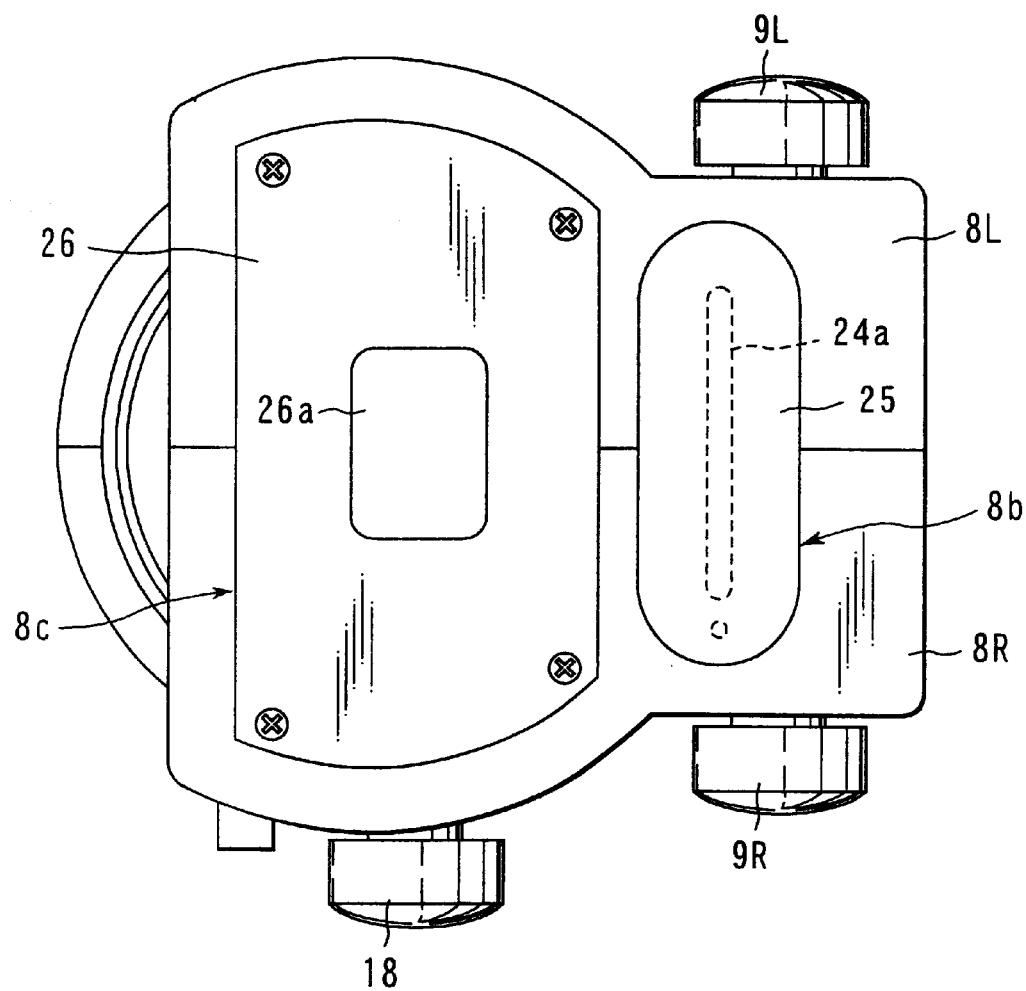
FIG. 3 is a plan view showing the schematic arrangement of the first embodiment.

FIGS. 1, 2, and 3 show the schematic arrangement of a microscope to which the present invention is applied. FIG. 1 is a side view, FIG. 2 is a front view, and FIG. 3 is a plan view.

In FIGS. 1, 2, and 3, reference numeral 1 denotes a base in which a light source portion 2 is buried. The light source portion 2 is equipped with an LED light source 3. In this case, the light source portion 2 has an opening portion 2a on the upper side of the base 1. Transmission light from the LED light source 3 is emitted upward via the opening portion 2a.

A column 4 serving as a support member stands upright on the base 1. The column 4 may be integrated into the base 1. As shown in FIG. 2, auxiliary columns 23L and 23R which stand upright on the base 1 are arranged on the two sides of the column 4. In this case, the base 1, and auxiliary columns 23L and 23R also function as support members.

A dovetail groove 4a is vertically formed in the side surface of the lower portion of the column 4. A stage 5 is vertically movable along the dovetail groove 4a.

The stage 5 has a stage main body 501 positioned parallel to the surface of the base 1, and a support portion 502 formed upright on the stage main body 501. A focusing portion 6 is mounted on the support portion 502.

The focusing portion 6 comprises a rack 601 mounted on the side surface of the support portion 502 of the stage 5 so as to face the column 4, and a pinion 603 which is arranged at the central portion of an operation shaft 602 rotatably supported through the column 4 and meshes with the rack 601. The operation shaft 602 is rotated to rotate the pinion 603, thereby vertically moving the stage 5 via the rack 601. In this case, as shown in FIG. 3, the operation shaft 602 extends through left and right covers 8L and 8R serving as an outer cover, and focusing handles 9L and 9R are attached to the ends of the operation shaft 602. The focusing handles 9L and 9R are rotated to rotate the operation shaft 602.

An aperture portion 5a for passing transmission light from the LED light source 3 is formed in the stage main body 501 of the stage 5. Chips 10 for fixing a transmission specimen 11 illuminated with illumination light from the LED light source 3 are arranged on the upper surface of the stage main body 501. A frost 12 for uniformly illuminating the transmission specimen 11 is set in the lower opening of the aperture portion 5a.

An arm 14 positioned parallel to the surface of the base 1 is attached to the intermediate portion of the column 4. A lens barrel 13 is fixed to the distal end of the arm 14. An observation optical system 16 is attached to an end of the lens barrel 13 that faces the transmission specimen 11 on the stage 5. The observation optical system 16 has fixed lenses 161, 162, and 163 along the optical axis. A lens holding portion 17 having lenses 171 and 172 is interposed between the fixed lenses 162 and 163. The lens holding portion 17 has an aperture portion 17a which holds the lenses 171 and 172, and a hole 17b formed in a direction perpendicular to the aperture portion 17a. The lens holding portion 17 enables pivotal motion in a plane parallel to the optical axis. In this case, every time the lens holding portion 17 pivots by 90°, the aperture portion 17a having the lenses 171 and 172, and the hole 17b are alternately positioned along the optical axis. This pivotal motion can also reverse the upper and lower positions of the lenses 171 and 172 along the optical axis. The magnification of an observation image can be switched by reverse of the upper and lower positions of the lenses 171 and 172, and the hole 17b.

As shown in FIG. 2, a click groove 17c is formed in the lens holding portion 17. A click ball 19 is fit in the click groove 17c to position pivotal motion of the lens holding portion 17 every 90°.

As shown in FIG. 2, a pivot shaft 17d is attached to the lens holding portion 17 so as to extend through the right cover 8R, and a zooming handle 18 is attached to the distal end of the pivot shaft 17d. By pivoting the zooming handle 18, the observation magnification is switched.

The lens barrel 13 has an image sensing element 21 at the imaging position of the observation optical system 16. The image sensing element 21 is mounted on a substrate 20 attached to a top plate 22. The top plate 22 is fixed to the upper end faces of the column 4 and auxiliary columns 23L and 23R.

A monitor 15 is arranged laterally at the lens barrel 13. The monitor 15 displays an observation image of the transmission specimen 11 sensed by the image sensing element 21, and is fixed from inside an attaching window 8a formed in the side surfaces of the left and right covers 8L and 8R.

A CPU unit 24 as an electrical control system unit having a slot portion 24a for a recording medium (not shown) is arranged in a space between the column 4 and the lens barrel 13 above the focusing portion 6 of the stage 5. The CPU unit 24 is fixed to the column 4. The slot portion 24a allows inserting a recording medium such as a smart medium from an upper window 8b of the left and right covers 8L and 8R shown in FIG. 3. A lid portion 25 which covers the upper window 8b is tightly fixed to the slot portion 24a. At this time, as shown in FIG. 1, a projecting portion 25a on the lower surface of the lid portion 25 presses an interlock switch 24b of the CPU unit 24 to turn the power supply on.

Another upper window 8c is formed in the upper surfaces of the left and right covers 8L and 8R, and a lid portion 26 having a window portion 26a at the central portion is fixed to the upper window 8c. A substrate 28 which supports a liquid crystal display monitor 27 is arranged on the inner side of the lid portion 26. In recording an observation image, the liquid crystal display monitor 27 displays the specimen observation date and time, remaining recording capacity, power supply state, failure mode, and the like. In playing back an observation image, the liquid crystal display monitor 27 displays the image number, power supply state, failure mode, and the like. These displayed data can externally be seen outside the microscope via the window portion 26a.

A power supply connector 29 is attached to the lower portion of the back surfaces of the left and right covers 8L and 8R. The connector 29 is connected to a power supply cord (not shown) connected to an external power supply. A switch operation portion 35 is arranged on the side surface of the right cover 8R. The switch operation portion 35 comprises a power switch 30, a display switch 31 for the monitor 15, a frame feed switch 32 in playing back a recorded image, a frame feed-back switch 33 in playing back a recorded image, and an image recording switch 34.

A shutter 36 is interposed between the aperture portion 5a of the stage main body 501 and the LED light source 3.

The image sensing element 21 has an electronic shutter (CCD shutter) for controlling to optimize exposure in sensing an image. In recording a sensed image, the incident light quantity on the image sensing element 21 is controlled by the opening degree of the shutter 36 so as not to excessively increase electronic shutter speed (shorten the exposure time) of the image sensing element 21 in image sensing operation of the image sensing element 21. The shutter 36 is controlled to be fully closed while the image sensing element 21 reads out charges accumulated in sensing an image.

Figure 4:
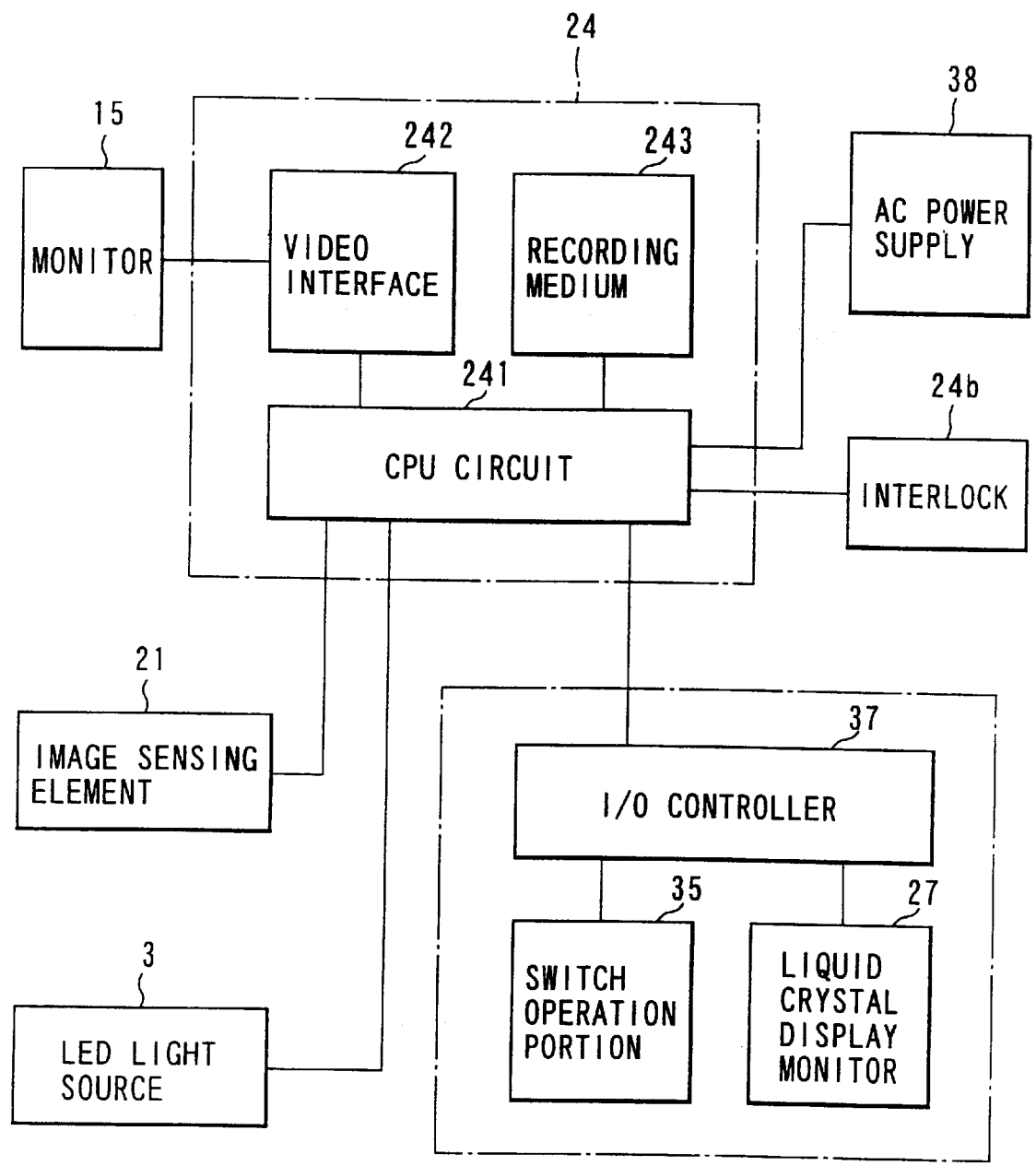
FIG. 4 is a block diagram showing the schematic arrangement of an electrical circuit used in the first embodiment.

FIG. 4 shows the electrical circuit of the microscope having this arrangement. The same reference numerals as in FIGS. 1 to 3 denote the same parts. In this case, the CPU unit 24 comprises a CPU circuit 241, video interface 242, and recording medium 243. The CPU circuit 241 is connected to an external AC power supply 38, the interlock switch 24b, the LED light source 3, the image sensing element 21, and the liquid crystal display monitor 27 and switch operation portion 35 via an I/O controller 37. The video interface 242 is connected to the monitor 15. When power is supplied from the AC power supply 38, the CPU circuit 241 outputs an ON instruction to the LED light source 3 in accordance with switch operation on the switch operation portion 35, captures an image of an observation image sensed by the image sensing element 21, and converts an output signal from the image sensing element into digital data. The CPU circuit 241 displays the sensed image on the monitor 15 via the video interface 242, and records it on the recording medium 243. The CPU circuit 241 displays the observation image recorded on the recording medium 243 on the monitor 15 via the video interface 242, and displays various pieces of recording or playback information on the liquid crystal display monitor 27 via the I/O controller 37.

Note that the switch operation portion 35 has the power switch 30, display switch 31, frame feed switch 32, frame feed-back switch 33, and image recording switch 34.

A case wherein the observation image of a specimen is recorded using the microscope having this arrangement will be explained. A transmission specimen 11 to be observed is placed on the aperture portion 5a of the stage 5. A recording medium is inserted into the slot portion 24a, and the power switch 30 is turned on. Then, a power ON instruction is supplied to the CPU circuit 241 via the I/O controller 37, and the LED light source 3 is turned on.

After the LED light source 3 is turned on, illumination light from the LED light source 3 is transmitted through the transmission specimen 11 via the aperture portion 5a of the stage 5, and is sensed as a transmission observation image by the image sensing element 21 via the observation optical system 16 of the lens barrel 13. The image of the observation image sensed by the image sensing element 21 is captured by the CPU circuit 241.

When the display switch 31 is turned on, a monitor display instruction is sent to the CPU circuit 241 via the I/O controller 37, and the observation image sensed by the image sensing element 21 is displayed on the monitor 15 via the video interface 242.

In this case, the focusing handles 9L and 9R of the focusing portion 6 are rotated to rotate the operation shaft 602, thereby vertically moving the stage 5 via the pinion 603 and rack 601. Accordingly, the focus can be adjusted on the monitor 15. The zooming handle 18 is pivoted to pivot the lens holding portion 17 via the pivot shaft 17d, thereby selecting the vertical relationship between the lenses 171 and 172 positioned along the optical axis or in the hole 17b. In this way, the magnification of the observation image can be switched.

When the image recording switch 34 is turned on, an image recording instruction is sent to the CPU circuit 241 via the I/O controller 37, and the image sensed by the image sensing element 21 is recorded on the recording medium 243.

A case wherein the observation image of a specimen recorded in this manner will be described. When the power switch 30 is turned off, and the display switch 31 is turned on, an image playback instruction is sent to the CPU circuit 241 via the I/O controller 37. Then, an observation image recorded on the recording medium 243 is read out by the CPU circuit 241, and displayed on the monitor 15 via the video interface 242. If the frame feed switch 32 or frame feed-back switch 33 is turned on in this state, a frame feed or frame feed-back instruction is sent to the CPU circuit 241 via the I/O controller 37, and an observation image of a desired frame can be played back and displayed.

In recording/playing back an observation image, the liquid crystal display monitor 27 displays, in accordance with a recording/playback instruction issued from the CPU circuit 241 via the I/O controller 37, the specimen observation date and time, remaining recording capacity, power supply state, failure mode, and the like in recording the observation image, or the image number, power supply state, failure mode, and the like in playing back the observation image.

When the lid portion 25 of the slot portion 24a is removed in the power ON state, the pressed state of the interlock switch 24b is canceled, and the power supply is forcibly turned off.

This arrangement allows observing the observation image of the transmission specimen 11 on the monitor 15. Compared to conventional specimen observation via an eyepiece lens, the observation image can be simultaneously observed by a plurality of observers, and specimen observation and its operation can be facilitated. Since the LED light source 3, stage 5, observation optical system 16, and image sensing element 21 are arranged along the optical axis of the observation optical system 16, and supported and integrated along the column 4, the overall microscope can be downsized to attain a space-saving microscope and improve the portability.

Since the CPU unit 24 for processing, e.g., image data of an observation image sensed by the image sensing element 21 is arranged behind (space between the lens barrel 13 and the column 4) the lens barrel 13, the CPU unit 24 can be efficiently stored in the outer cover to further downsize the overall microscope.

The observation magnification of the observation optical system 16 with respect to the transmission specimen 11 can be switched only by pivoting the zooming handle 18, which realizes various specimen observation states with a simple arrangement.

Moreover, an observation image can be recorded without any photographing unit such as a photographing device other than the microscope. An image recorded on a medium can be played back without any medium playback unit other than the microscope.

The interlock switch 24b can prevent insertion/removal of a recording medium while the AC power supply is ON, thus preventing unwanted damage to the medium.

Since an image is recorded as digital data on a recording medium, it can be easily processed by a personal computer or the like.

The use of the LED as an illumination light source can reduce power consumption.

In recording a sensed image, the incident light quantity on the image sensing element 21 is controlled by the opening degree of the shutter 36 so as not to excessively increase the electronic shutter speed (shorten the exposure time) of the image sensing element 21 in image sensing operation of the image sensing element 21. An image can always be recorded by proper exposure without any control error caused by an excessively high electronic shutter speed. The shutter 36 is controlled to be fully closed while the image sensing element 21 reads out charges accumulated in sensing an image. For this reason, while the image sensing element 21 reads out charges accumulated in sensing an image, illumination light from the LED light source 3 is shielded not to cause any smear, and a high-quality image can be recorded.

The present invention is not limited to the above embodiment, and can be variously modified as follows within the spirit and scope of the invention.

(1) In the above description, the monitor 15 is fixed to the attaching window 8a formed in the side surfaces of the left and right covers 8L and 8R. Alternatively, the monitor 15 may be movable in a tilting direction as represented by a broken line in FIG. 1. In this case, the angle of the monitor 15 can be adjusted in accordance with the visual angle of the observer, and the observer can more easily observe an image.

(2) In the above description, the transmission specimen 11 placed on the stage 5 is fixed and held. Alternatively, a slide member 102 as represented by a broken line in FIG. 1 is mounted on the stage 5, and the transmission specimen 11 is placed on the slide member 102. This facilitates exchange of the transmission specimen 11.

(3) In the above description, the shutter 36 is interposed between the aperture portion 5a of the stage main body 501 and the LED light source 3. However, the position of the shutter 36 can be arbitrarily set as far as it is between the LED light source 3 and the light source portion 2.

(4) In the above description, power is supplied from the external AC power supply 38. Alternatively, a battery 103 as represented by a broken line in FIG. 1 may be arranged below the base 1, which realizes the use of the microscope in an outdoor environment or the like in which no external power supply is ensured. If the charging voltage of the battery is made to match the voltage for the cigarette lighter of an automobile, power supply and charging inside the automobile are enabled.

(5) In the above description, the image recording switch 34 is arranged on the side surfaces of the left and right covers 8L and 8R. Alternatively, only the image recording switch 34 may be arranged on the upper surfaces of the left and right covers 8L and 8R. With this arrangement, the overall microscope does not incline in operating the image recording switch 34, and the image recording switch 34 is not operated erroneously in place of another switch. Wasteful recording of an observation image can be avoided.

(6) If an output terminal 104 for a video output or the like, as represented by a broken line in FIG. 1, is attached to the side surfaces of the left and right covers 8L and 8R, an observation image can also be displayed on an external monitor.

(7) By attaching a strap 105 as represented by a broken line in FIG. 1 to the outer cover, i.e., left and right covers 8L and 8R, the microscope can be easily carried and conveyed.

(8) In the above description, the LED is used for illumination light. However, the present invention is not limited to this, and may use a general incandescent lamp or halogen lamp.

Second Embodiment

Figure 5:
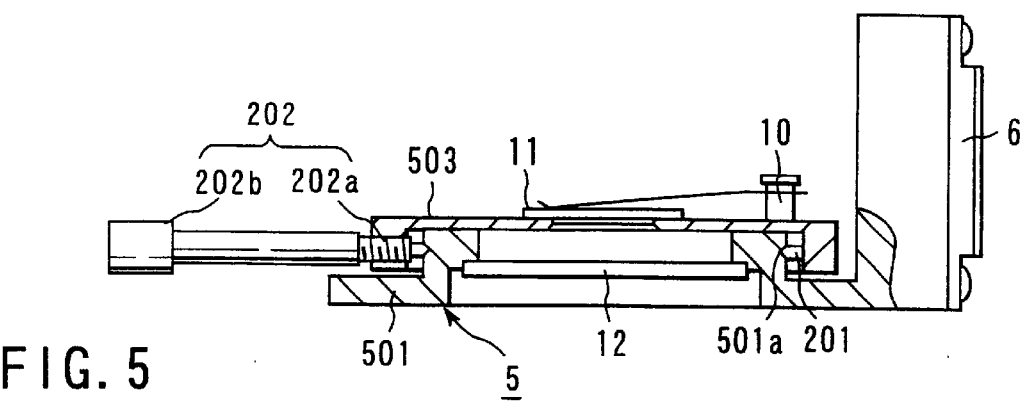
FIG. 5 is a sectional view showing the schematic arrangement of the main part according to the second embodiment of the present invention.

FIG. 5 shows only the main part of a schematic arrangement in the second embodiment of the present invention. The same reference numerals as in FIG. 1 denote the same parts.

FIG. 5 shows only a stage 5. A movable stage 503 is arranged on the upper surface of a stage main body 501. One plunger 201 and two press members 202 are arranged at an equal interval along the peripheral edge portion of the stage main body 501 between the stage main body 501 and the movable stage 503. The plunger 201 is urged against a V-groove 501a in the peripheral surface of the stage main body 501 to horizontally press the stage main body 501. Each press member 202 has a screw portion 202a screwed in the movable stage 503 and a knob 202b. The knob 202b is turned to adjust the screwing amount of the screw portion 202a, and the movable stage 503 is horizontally pressed against the pressure of the plunger 201 to adjust the position of the movable stage 503.

Only by adjusting the screwing amount of the screw portion 202a while turning the knobs 202b of the two press members 202, the position of the movable stage 503 can be finely adjusted in back-and-forth direction and right-and-left directions, and the observation portion of a transmission specimen 11 can be easily moved.

Third Embodiment

Figure 6:
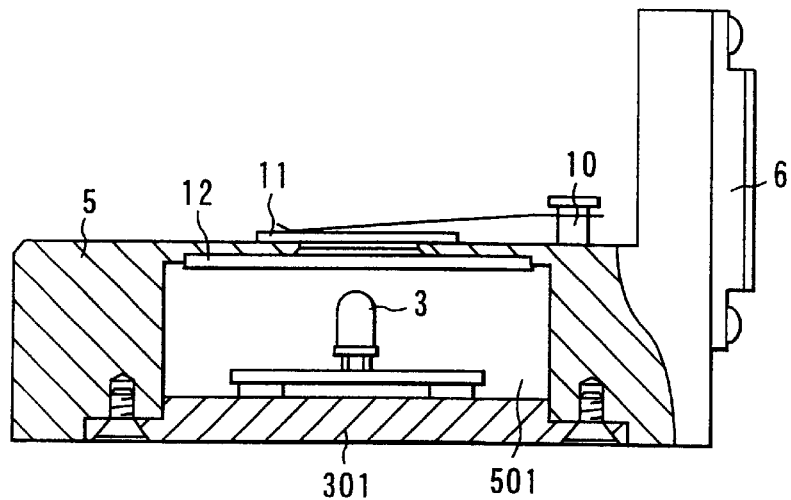
FIG. 6 is a sectional view showing the schematic arrangement of the main part according to the third embodiment of the present invention.

FIG. 6 shows only the main part of a schematic arrangement in the third embodiment of the present invention. The same reference numerals as in FIG. 1 denote the same parts.

In this case, a hollow portion is formed in a stage main body 501 of a stage 5, and a light source portion 301 having an LED light source 3 is incorporated in the hollow portion.

Since the interval between the LED light source 3 and a transmission specimen 11 can be kept constant regardless of vertical movement of the stage 5, the transmission specimen 11 can always be uniformly illuminated under the same conditions.

Fourth Embodiment

Figure 7:
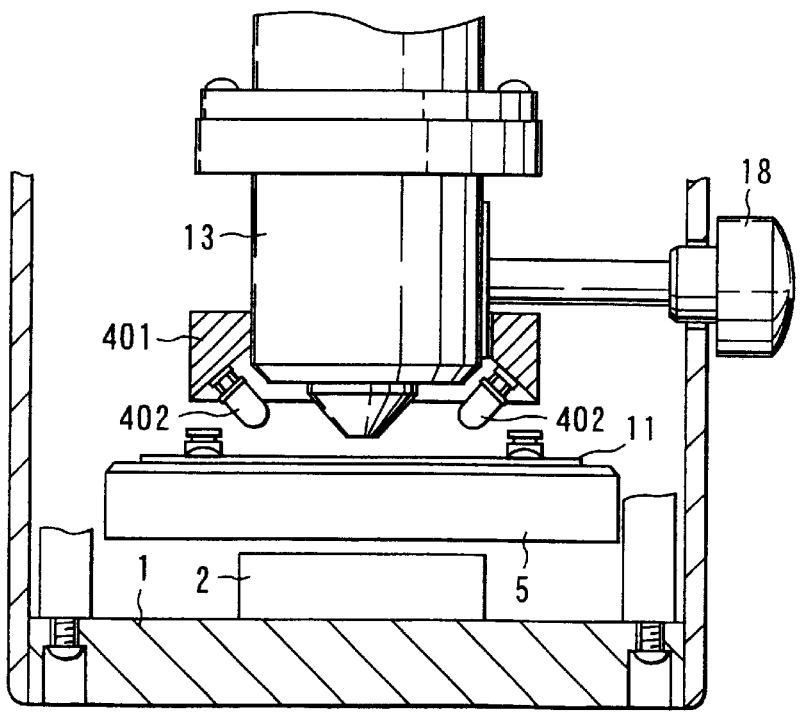
FIG. 7 is a sectional view showing the schematic arrangement of the main part according to the fourth embodiment of the present invention.

FIG. 7 shows only the main part of a schematic arrangement in the fourth embodiment of the present invention. The same reference numerals as in FIG. 2 denote the same parts.

In this case, an annular illumination portion 401 is arranged around an end portion of a lens barrel 13 that faces a stage 5. The illumination portion 401 has a plurality of LED light sources 402 at an equal interval. These LED light sources 402 irradiate a specimen on the stage 5 with incident illumination light.

This structure allows even observation of a specimen such as a metal specimen which does not transmit light.

These embodiments include the following inventions.

(1) A microscope is characterized by comprising a support member which stands upright, an LED light source, a stage for placing a specimen irradiated with light from the LED light source, a lens barrel which is arranged to face the specimen on the stage, and has an observation optical system for acquiring the observation image of the specimen, an image sensing element which is arranged at the imaging position of the observation optical system of the lens barrel, and senses the observation image of the specimen, a monitor for displaying the observation image sensed by the image sensing element, and a recording means for recording image data of the observation image sensed by the image sensing element, wherein at least the LED light source, stage, lens barrel, and image sensing element are linearly aligned along the support member.

(2) The microscope described in (1) is characterized in that the microscope further comprises an electrical processing unit for processing the image data of the observation image sensed by the image sensing element, and the electrical processing unit is arranged behind the lens barrel.

(3) A microscope is characterized by comprising a stage for placing a specimen, a lens barrel which is arranged to face the specimen on the stage, and has an observation optical system for acquiring the observation image of the specimen, an LED light source for illuminating the specimen on the stage from the lens barrel side, an image sensing element which is arranged at the imaging position of the observation optical system of the lens barrel, and senses the observation image of the specimen, an electrical processing unit for processing an output signal from the image sensing element, a monitor for displaying the image data of the observation image output from the electrical processing unit, and a recording means for recording the image data of the observation image, wherein the stage, lens barrel, and image sensing element are linearly aligned, and the electrical processing unit is arranged behind the lens barrel.

(4) The recording medium 243 is arranged on the CPU unit 24. Alternatively, a recording device such as a hard disk may be connected to an external output terminal (connector) of the microscope to record image information on the external recording device. This microscope can be further downsized.

According to these inventions, the observation magnification of a specimen can be switched only by pivoting the observation optical system, which realizes various specimen observation states with a simple arrangement.

Fifth Embodiment

Figure 8:
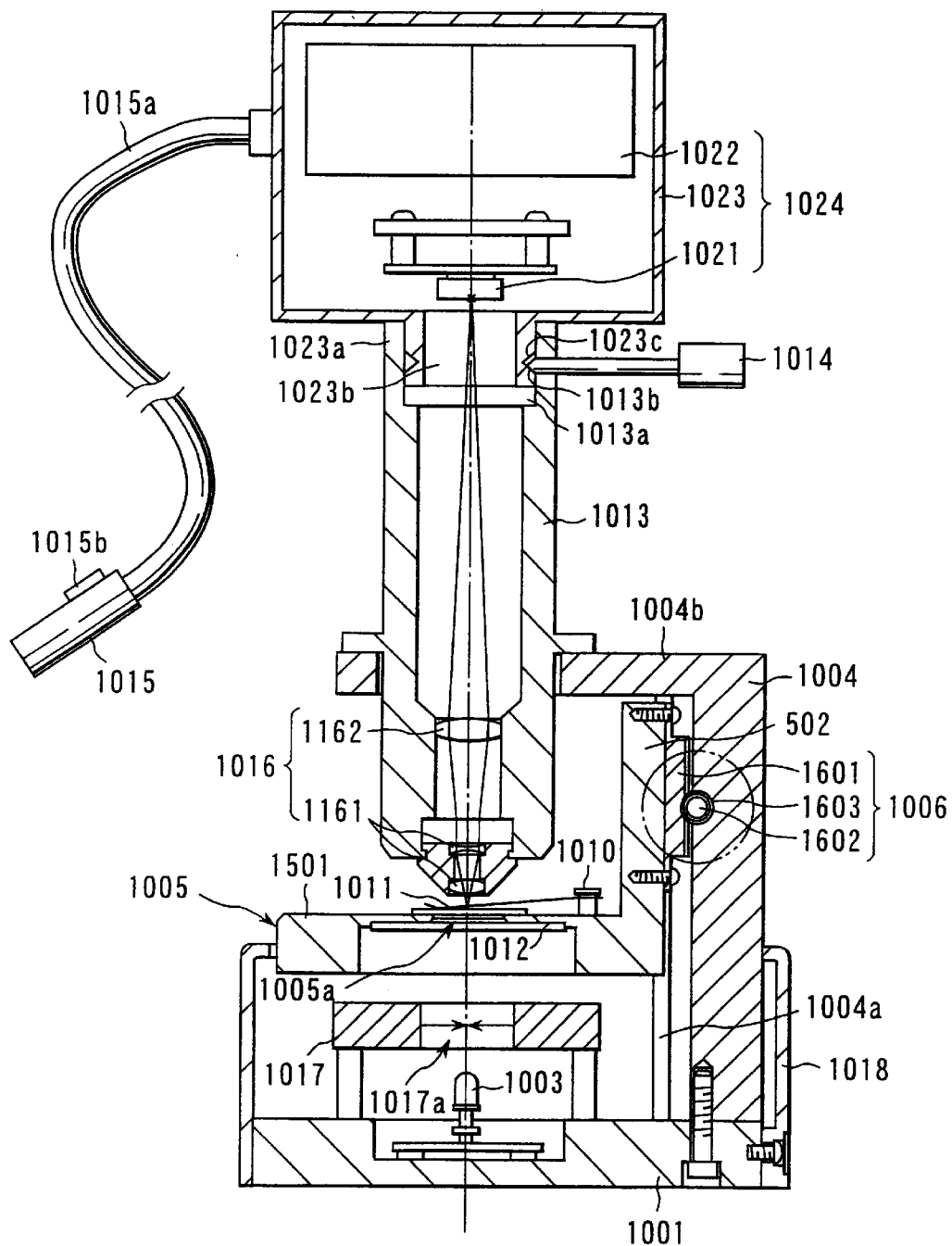
FIG. 8 is a side view showing a transmission illumination microscope according to the fifth embodiment of the present invention.
Figure 9:
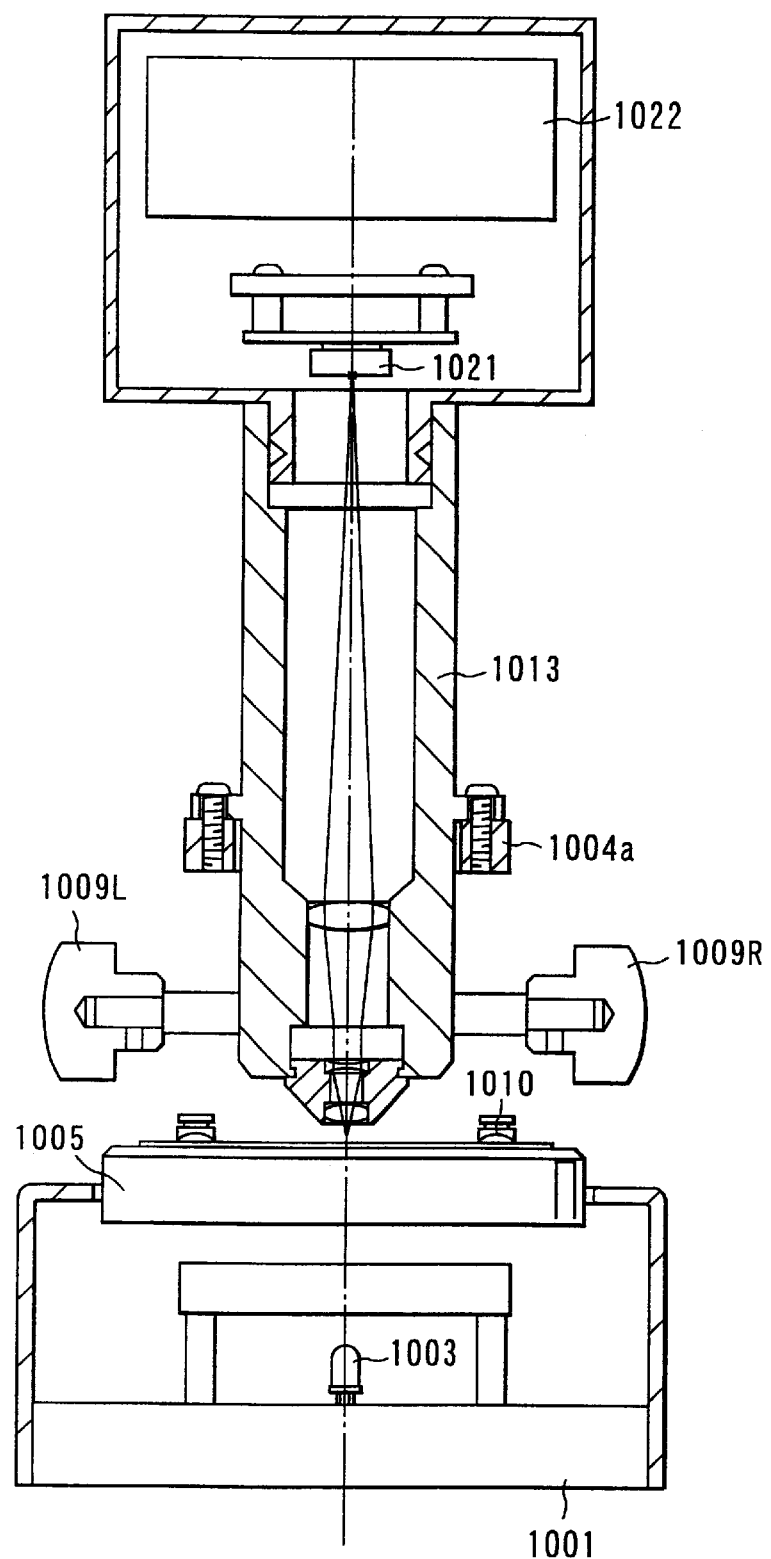
FIG. 9 is a front view showing the transmission illumination microscope according to the fifth embodiment of the present invention.

FIGS. 8 and 9 show the schematic arrangement of a microscope to which the present invention is applied.

FIG. 8 is a side view, and FIG. 9 is a front view.

In FIGS. 8 and 9, reference numeral 1001 denotes a base on which an LED light source 1003 is arranged. A mechanical shutter mechanism 1017 having an opening portion 1017a which opens not to shield illumination light from the light source 1003 is fixed to the base 1001 above the LED light source 1003.

The mechanical shutter mechanism 1017 is constituted by a known mechanism (not shown), and electrically connected to a control unit 1022 (to be described later). The mechanical shutter mechanism 1017 can drive the shutter at a high speed in accordance with an instruction from the control unit 1022 to fully open/close the opening portion 1017a.

The base 1001 is covered with a cover 1018 so as not to externally leak illumination light from the LED light source 1003.

A support arm 1004 is fixed to the base 1001, and a dovetail groove 1004a is vertically formed in the side surface of the support arm 1004. A stage 1005 is vertically movable along the dovetail groove 1004a.

The stage 1005 has a stage main body 1501 positioned parallel to the surface of the base 1001, and a support portion 1502 formed upright on the stage main body 1501. A focusing portion 1006 is mounted on the support portion 1502.

The focusing portion 1006 comprises a rack 1601 mounted on the side surface of the support portion 1502 of the stage 1005 so as to face the column 1004, and a pinion 1603 which is arranged at the central portion of an operation shaft 1602 rotatably supported through the support arm 1004 and meshes with the rack 1601. The operation shaft 1602 is rotated to rotate the pinion 1603, thereby vertically moving the stage 1005 via the rack 1601.

Focusing handles 1009L and 1009R are attached to the two ends of the operation shaft 1602. The focusing handles 1009L and 1009R are rotated to rotate the operation shaft 1602.

An aperture portion 1005a for passing illumination light from the LED light source 1003 is formed in the stage main body 1501 of the stage 1005. Chips 1010 for fixing a specimen 1011 illuminated with illumination light from the LED light source 1003 are arranged on the upper surface of the stage main body 1501. A light diffusion plate 1012 for uniformly illuminating the specimen 1011 is set in the lower opening portion of the aperture portion 1005a.

A horizontal arm portion 1004b formed parallel to the surface of the base 1001 is attached to the upper side of the support arm 1004. A lens barrel 1013 is fixed to the distal end of the horizontal arm portion 1004b. An imaging optical system 1016 is attached to an end of the lens barrel 1013 that faces the specimen 1011 on the stage 1005. The imaging optical system 1016 has an objective lens 1161 and imaging lens 1162 along the optical axis.

An insertion hole 1013a and internal thread 1013b are formed in the upper end portion of the lens barrel 1013. A knob 1014 is screwed into the internal thread 1013b.

Reference numeral 1024 denotes an image sensing unit which is made up of a housing 1023, the control unit 1022, and an image sensing element 1021 electrically connected to the control unit 1022, and has an electronic shutter function.

A portion of the housing 1023 that faces the image sensing element 1021 has an insertion portion 1023a detachably fitted and inserted in the insertion hole 1013a of the lens barrel 1013. The insertion portion 1023a has a hole portion 1023b for guiding observation light to the image sensing surface of the image sensing element 1021, and a V-groove 1023c formed at a position slightly above the knob 1014.

When the knob 1014 is rotated and screwed, the distal end of the knob 1014 presses the V-groove 1023c in a direction in which the image sensing unit 1024 is urged down. As a result, the lens barrel 1013 and image sensing element 1021 are optically reliably coupled.

At this time, the image sensing element 1021 is positioned at the imaging position of the imaging optical system 1016.

The control unit 1022 is connected to a power supply 1029, recording device 1030, and monitor 1031 (none of them are shown).

Reference numeral 1015 denotes a hand switch 1015 electrically connected to the control unit 1022 via a flexible cord 1015a. The hand switch 1015 has a release switch operation portion 1015b which is pressed in sensing an image.

Figure 10:
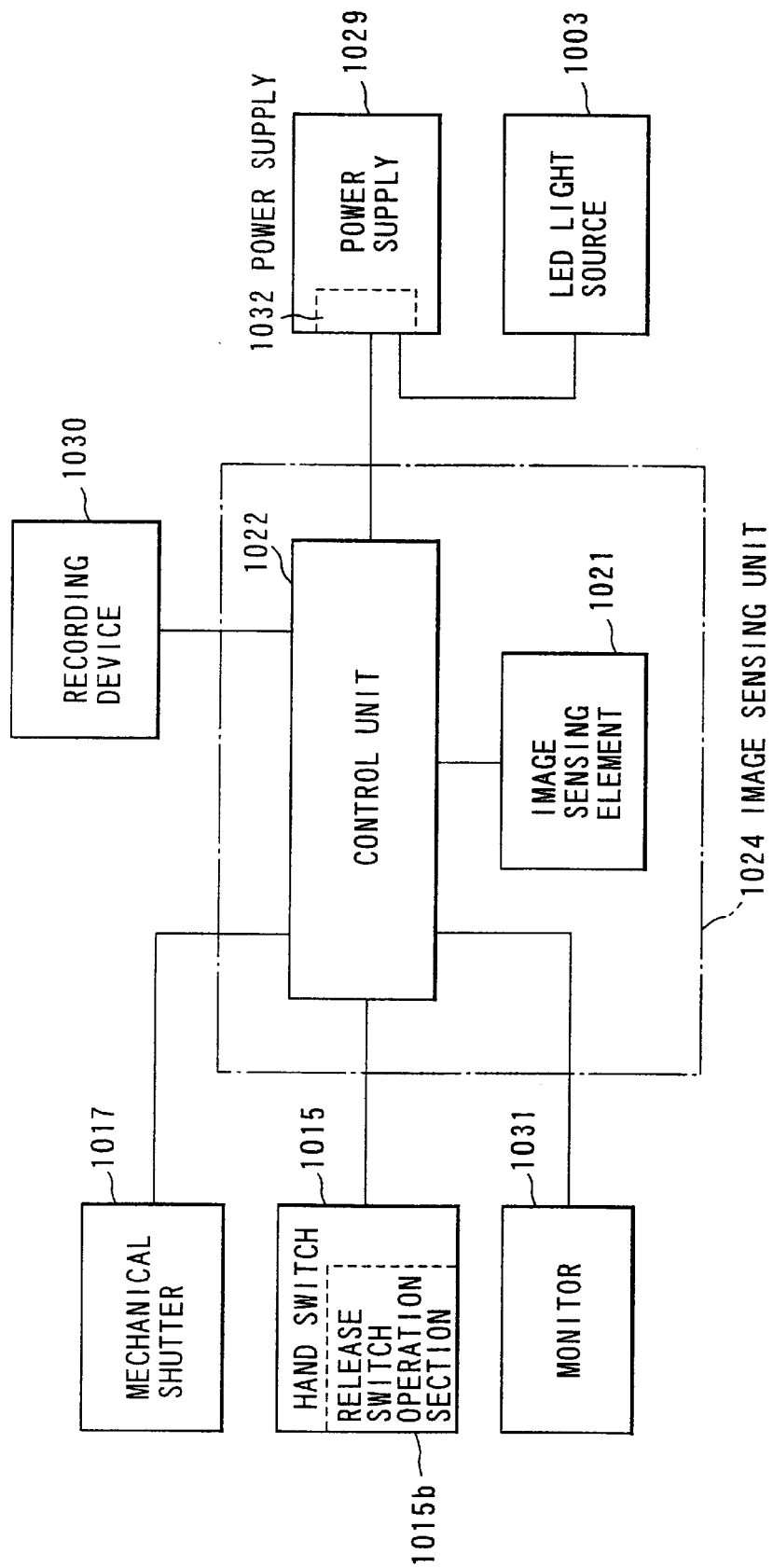
FIG. 10 is a block diagram showing the electrical circuit of the transmission illumination microscope according to the fifth embodiment of the present invention.

FIG. 10 shows the electrical circuit of the microscope having this arrangement. The same reference numerals as in FIGS. 8 and 9 denote the same parts.

The power supply 1029 has a power switch 1032. When the power switch 1032 is turned on, power is supplied from the power supply 1029 to turn on the LED light source 1003. The control unit 1022 captures an image of an observation image sensed by the image sensing element 1021, and displays the sensed image on the monitor 1031.

When the release switch operation portion 1015b is turned on in recording an observation image, the image sensing element 1021 captures the observation image, and the control unit 1022 determines an exposure time.

The electronic shutter speed is controlled by this exposure time. Instantaneously when charges accumulated in the image sensing element 1021 are read out, the mechanical shutter mechanism 1017 fully closes the opening portion 1017a. After all the charges accumulated in the image sensing element are read out, the mechanical shutter mechanism 1017 fully opens the opening portion 1017a. A still image sensed at this time is recorded by the recording device 1030, and displayed on the monitor 1022 for several sec. The series of operations are controlled by the control unit 1022.

A case wherein the observation image of a specimen is observed on the monitor and recorded using the microscope having this arrangement will be explained. A specimen 1011 to be observed is placed on the aperture portion 1005a of the stage 1005, and the power switch 1032 is turned on to turn on the LED light source 1003.

After the LED light source 1003 is turned on, illumination light from the LED light source 1003 is transmitted through the light diffusion plate 1012 via the opening portion 1017a of the mechanical shutter mechanism 1017 to reduce illumination nonuniformity. Then, the illumination light is transmitted through the specimen 1011 via the aperture portion 1005a of the stage 1005, and is sensed as a transmission observation image by the image sensing element 1021 via the imaging optical system 1016 of the lens barrel 1013.

The image of the observation image sensed by the image sensing element 1021 is captured by the control unit 1022, and displayed on the monitor 1031.

In this case, the focusing handles 1009L and 1009R of the focusing portion 1006 are rotated to rotate the operation shaft 1602, thereby vertically moving the stage 1005 via the pinion 1603 and rack 1601. Accordingly, the focus can be adjusted on the monitor 1031.

By moving the specimen 1011, the observation portion can be changed.

While an image displayed on the monitor 1031 is observed, framing and focusing are executed to a portion of the specimen 1011 to be recorded, and the release switch operation portion 1015b of the hand switch 1015 is turned on. Then, an observation image is captured by the image sensing element 1021, and the control unit 1022 determines an exposure time. The control unit 1022 controls the electronic shutter speed by the exposure time. Instantaneously when charges accumulated in the image sensing element 1021 are read out, the mechanical shutter mechanism 1017 fully closes the opening portion 1017a.

As a result, illumination light to the image sensing element 1021 is completely shielded. After all the charges accumulated in the image sensing element 1021 are read out, the control unit 1022 controls the mechanical shutter mechanism 1017 so as to fully open the opening portion 1017a. An observation image sensed at this time is recorded by the recording device 1030, and displayed on the monitor,1031 for several sec.

A case wherein the image sensing unit 1024 is exchanged with an image sensing unit having another specification, e.g., a higher-resolution image sensing element will be explained. The knob 1014 is rotated and loosed to remove the distal end portion of the knob 1014 from the V-groove 1023c. The insertion portion 1023a of the image sensing unit 1024 can be removed from the insertion hole 1013a to dismount the image sensing unit 1024 from the lens barrel 1013.

The insertion portion of another image sensing unit having an insertion portion 1023a and V-groove 1023c identical in shape to the image sensing unit 1024 is inserted in the insertion hole 1013a. The knob 1014 is rotated and fastened to press the V-groove down by the distal end of the knob 1014. The image sensing unit is reliably attached to the lens barrel 1013.

In this arrangement, the mechanical shutter mechanism 1017 is arranged not on the imaging optical system which couples the stage 1005 (specimen 1011) and image sensing element 1021, but between the stage 1005 (specimen 1011) and the LED light source 1003. Dust such as wear powder generated upon driving the mechanical shutter mechanism 1017 does not attach to the imaging optical system, and a high-quality image free from degradation of an observation image can be recorded.

Since the mechanical shutter mechanism 1017 is not arranged along the optical axis of the imaging optical system 1016, attention need not be paid to deposition or entry of dust to the imaging optical system even during assembly. The assembly time can be shortened to reduce the cost.

Since the mechanical shutter mechanism 1017 is arranged at the lower portion of the microscope, the barycenter of the microscope is lowered, and the microscope hardly falls.

The mechanical shutter mechanism 1017 is arranged apart from the image sensing element 1021, imaging optical system 1016, and specimen 1011. Even if images are successively sensed, vibrations upon driving the mechanical shutter mechanism are hardly transmitted to the image sensing element 1021, imaging optical system 1016, and specimen 1011. A high-quality image free from any blur can be sensed (recorded).

Since the LED light source 1003 is used as a light source, the mechanical shutter mechanism 1017 can also be downsized to downsize the overall microscope and reduce power.

The hand switch 1015 is electrically connected to the image sensing unit 1024 via the flexible cord 1015a. Vibrations generated when the release switch operation portion 1015b of the hand switch 1015 is operated are not transmitted to the image sensing element 1021, imaging optical system 1016, and specimen 1011. A high-quality image free from any blur can be sensed (recorded).

Sixth Embodiment

Figure 11:
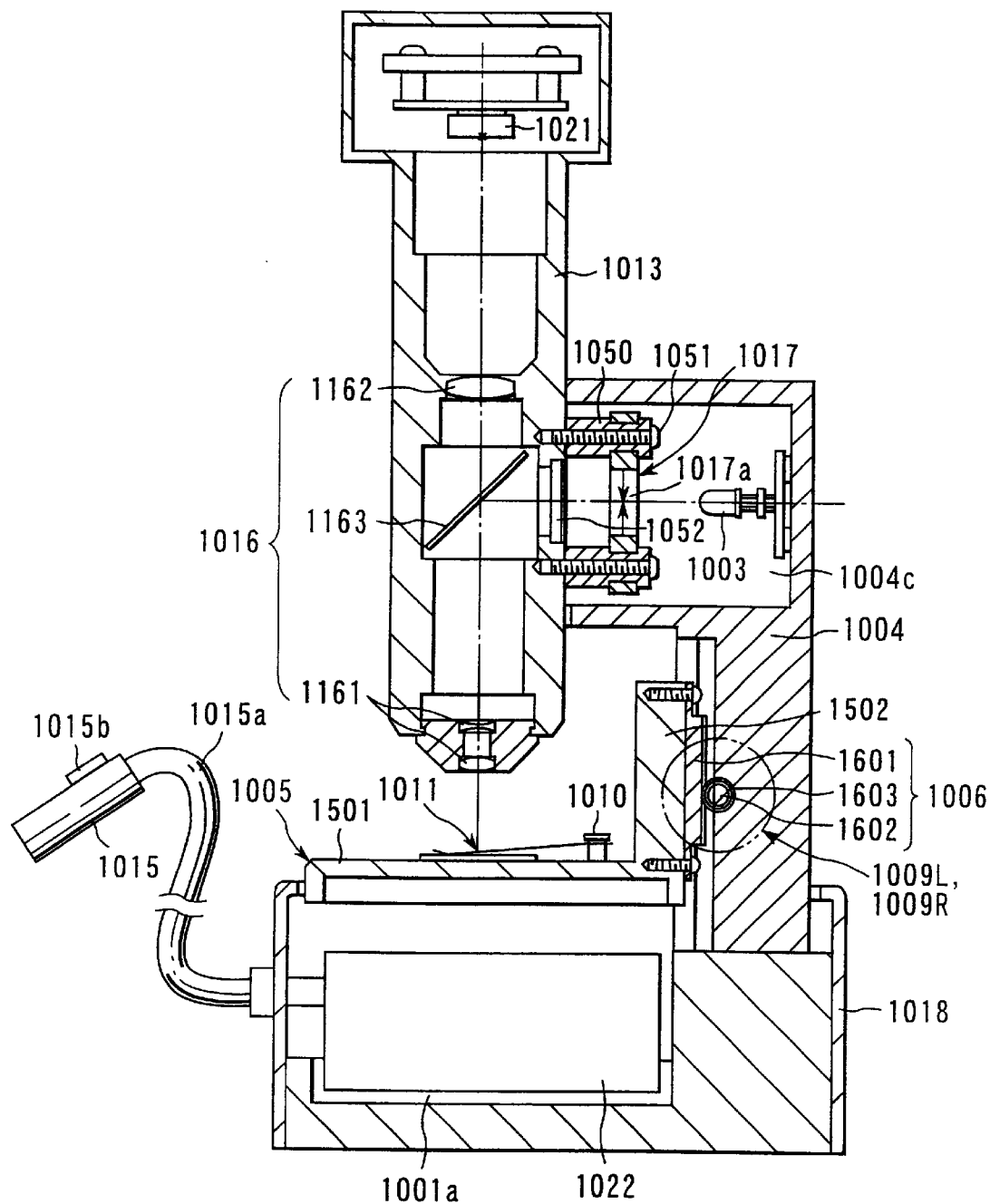
FIG. 11 is a side view showing a transmission illumination microscope according to the sixth embodiment of the present invention.

FIG. 11 is a side view showing the schematic arrangement of a coaxial incident-light illumination microscope to which the present invention is applied. The same reference numerals as in the fifth embodiment denote the same parts, and a detailed description thereof will be omitted.

Reference numeral 1163 denotes a semi-transmission reflecting member such as a half-mirror or half-prism. An LED light source 1003 is stored in a light source storage portion 1004c arranged at the upper portion of a support arm 1004.

Illumination light from the LED light source 1003 illuminates a specimen 1011 via the semi-transmission reflecting member 1163 and an objective lens 1161. The observation image of the specimen 1011 is formed via the objective lens 1161, the semi-transmission reflecting member 1163, and an imaging lens 1162 on an image sensing element 1021 fixed to the upper portion of a lens barrel 1013.

That is, the objective lens 1161, semi-transmission reflecting member 1163, and imaging lens 1162 constitute an imaging optical system 1016. The image sensing element 1021 is electrically connected to a control unit 1022 stored in a control unit storage space 1001a formed in a base 1001, and has an electronic shutter function.

A mechanical shutter mechanism 1017 having an opening portion 1017a which opens not to shield illumination light from the LED light source 1003 is fixed by several screws 1051 to the lens barrel 1013 via, e.g., a rubber vibration absorber 1050 between the LED light source 1003 and the semi-transmission reflecting member 1163.

The mechanical shutter mechanism 1017 is constituted by a known mechanism (not shown), and electrically connected to the control unit 1022. The mechanical shutter mechanism 1017 can drive the shutter at a high speed in accordance with an instruction from the control unit 1022 to fully open/close the opening portion 1017a.

A light-transmitting dustproof member 1052 for preventing dust such as wear powder generated from the mechanical shutter mechanism 1017 from entering the optical axis of the imaging optical system 1016 is fixed to the lens barrel 1013 between the semi-transmission reflecting member 1163 and the mechanical shutter mechanism 1017.

The light-transmitting dustproof member 1052 is made of a material such as glass or transparent plastic which transmit light so as not to shield illumination light from the LED light source 1003.

Figure 12:
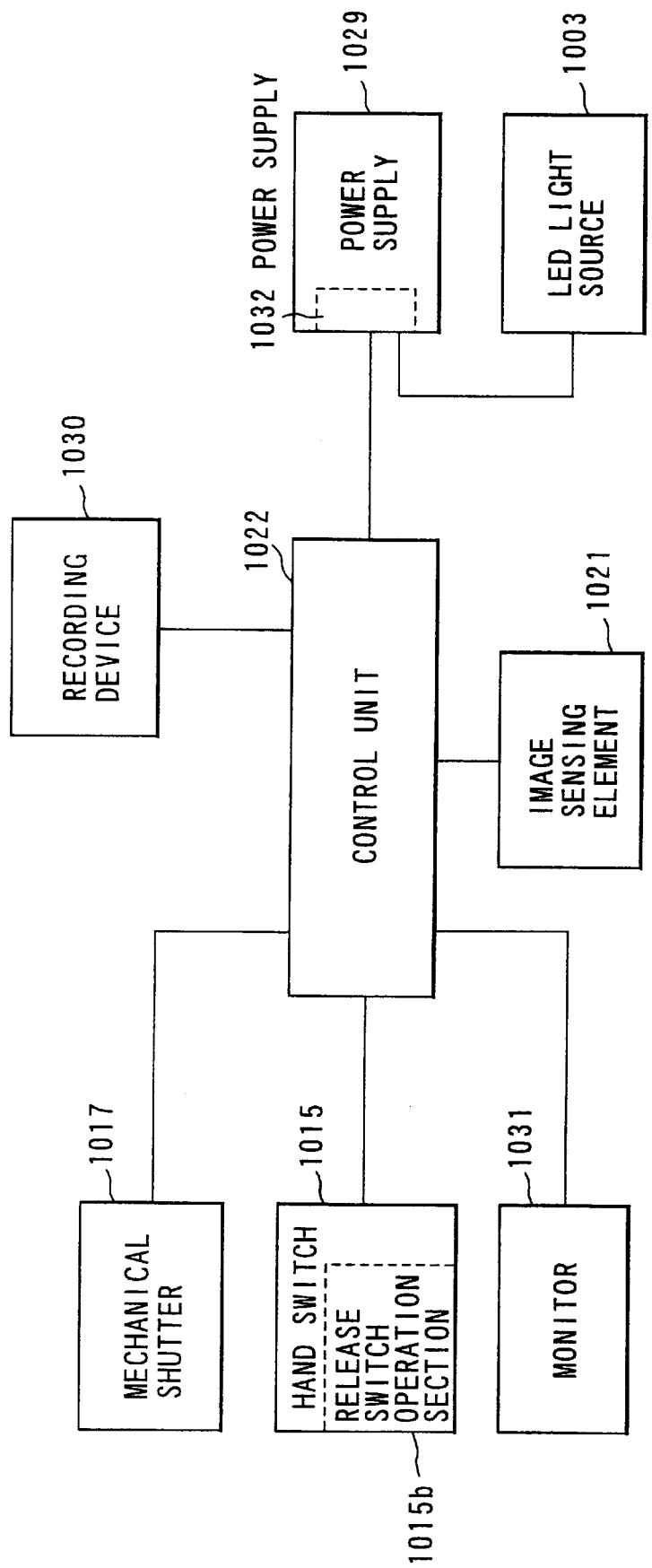
FIG. 12 is a block diagram showing the electrical circuit of the transmission illumination microscope according to the sixth embodiment of the present invention.

FIG. 12 shows the electrical circuit of the microscope having this arrangement. The same reference numerals as in FIG. 11 denote the same parts. A power supply 1029 has a power switch 1032. When the power switch 1032 is turned on, power is supplied from the power supply 1029 to turn on the LED light source 1003. The control unit 1022 captures an image of an observation image sensed by the image sensing element 1021, and displays the sensed image on a monitor 1031.

When a release switch operation portion 1015b is turned on in recording an observation image, the image sensing element 1021 captures the observation image, and the control unit 1022 determines an exposure time.

The electronic shutter speed is controlled by this exposure time. Instantaneously when charges accumulated in the image sensing element 1021 are read out, the mechanical shutter mechanism 1017 fully closes the opening portion 1017a. After all the charges accumulated in the image sensing element are read out, the mechanical shutter mechanism 1017 fully opens the opening portion 1017a. A still image sensed at this time is recorded by the recording device 1030, and displayed on the monitor 1022 for several sec. The series of operations are controlled by the control unit 22.

A case wherein the observation image of the specimen 1011 is observed on the monitor and recorded using the microscope having this arrangement will be explained. A specimen 1011 to be observed is placed on a stage 1005, and the power switch 1032 is turned on to turn on the LED light source 1003.

After the LED light source 1003 is turned on, illumination light from the LED light source 1003 is reflected by the semi-transmission reflecting member 1163 toward the objective lens 1161 via the opening portion 1017a of the mechanical shutter mechanism 1017 and the light-transmitting dustproof member 1052, and illuminates the specimen 1011 via the objective lens 1161.

The observation image of the specimen 1011 is sensed as an incident observation image by the image sensing element 1021 via the imaging optical system 1016 of the lens barrel 1013. The image of the observation image sensed by the image sensing element 1021 is captured by the control unit 1022, and displayed on the monitor 1031.

In this case, focusing handles 1009L and 1009R of a focusing portion 1006 are rotated to rotate an operation shaft 1602, thereby vertically moving the stage 1005 via a pinion 1603 and rack 1601. Accordingly, the focus can be adjusted on the monitor 1022.

By moving the specimen 1011, the observation portion can be changed.

While an image displayed on the monitor 1031 is observed, framing and focusing are executed to a portion of the specimen 1011 to be recorded, and the release switch operation portion 1015b of a hand switch 1015 is turned on. Then, an observation image is captured by the image sensing element 1021, and the control unit 1022 determines an exposure time.

The control unit 1022 controls the electronic shutter speed by the exposure time. Instantaneously when charges accumulated in the image sensing element 1021 are read out, the mechanical shutter mechanism 1017 fully closes the opening portion 1017a.

Consequently, illumination light to the image sensing element 1021 is completely shielded. After all the charges accumulated in the image sensing element 1021 are read out, the control unit 1022 controls the mechanical shutter mechanism 1017 so as to fully open the opening portion 1017a. An observation image sensed at this time is recorded by the recording device 1030, and displayed on the monitor 1022 for several sec.

Vibrations generated when the mechanical shutter mechanism 1017 opens/closes the opening portion 1017a are absorbed by the vibration absorber 1050, and are not transmitted to other portions such as the lens barrel 1013, imaging optical system 1016, and specimen 1011.

In this arrangement, the mechanical shutter mechanism 1017 is interposed between the LED light source 1003 and the light-transmitting dustproof member 1052. Thus, dust such as wear powder generated upon driving the mechanical shutter mechanism 1017 does not attach to the imaging optical system, and a high-quality image free from degradation of an observation image can be recorded.

Since the mechanical shutter mechanism 1017 is not arranged along the optical axis of the imaging optical system 1016, attention need not be paid to deposition or entry of dust to the imaging optical system even during assembly. The assembly time can be shortened to reduce the cost.

The mechanical shutter mechanism 1017 is fixed to the lens barrel 1017 via the vibration absorber. Even if images are successively sensed, vibrations upon driving the mechanical shutter mechanism 1017 are not transmitted to other portions such as the image sensing element 1021, imaging optical system 1016, and specimen 1011. A high-quality image free from any blur can be sensed (recorded).

Since the control unit 1022 is stored in the control circuit storage space 1001a of the base 1001, the upper portion of the lens barrel 1013 can be made flat and compact, and does not obstruct the visual angle of the observer. Even while the entire size is suppressed small, the position of the stage 1005 can be set high, the insertion operability of the specimen 1011 is improved, and the specimen 1011 can be easily directly observed. Moreover, even while the entire size is suppressed small, the barycenter is lowered, and the microscope hardly falls and is excellent in stability.

The light source 1003 and mechanical shutter mechanism 1017 are arranged in the support arm 1004, resulting in a compact microscope.

The image sensing element 1021 and control unit 1022 are integrated into the microscope, resulting in a compact microscope.

Note that the present invention is not limited to only the fifth and sixth embodiments, and can be variously modified within the spirit and scope of the invention.

(1) The above-described microscope uses the LED light source 1003 as a light source, but may use a halogen lamp, xenon lamp, or the like as long as light is emitted. Instead of the light source, a mirror may be arranged to take the sunlight or light of a room light or the like. Also with this arrangement, the same effects can be obtained.

(2) In the above-described microscope, the user cannot directly look through the microscope. Alternatively, it is possible to split the optical path for the imaging optical system 1016 into two by a half-mirror or the like, and arrange an image sensing element along one optical path and an eyepiece lens along the other optical path so as to allow the user to directly look through the microscope.

(3) The above-described microscope uses rubber for the vibration absorber 1050. However, the material is not limited to this so far as it absorbs vibrations.

(4) The imaging optical system in the above-described microscope may take any arrangement regardless of the lens layout and the number of lenses as long as the image of the specimen 1011 can be formed on the image sensing element 1021.

Seventh Embodiment

The seventh embodiment of the present invention will be described with reference to FIG. 13.

Figure 13:
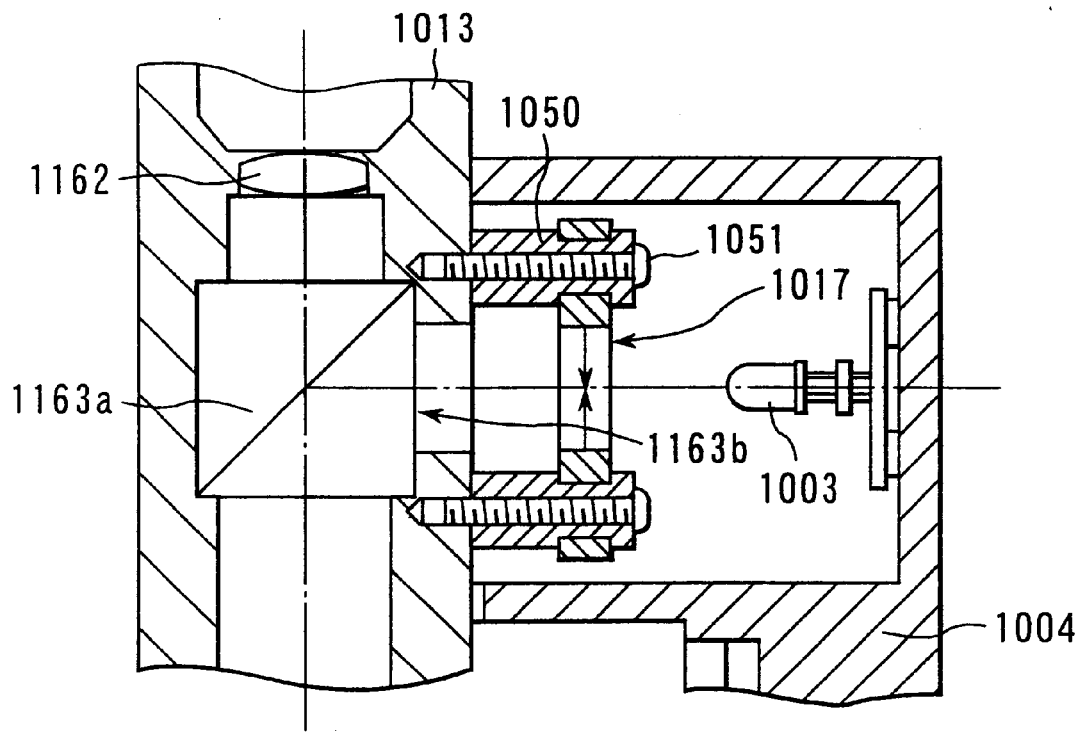
FIG. 13 is a sectional view showing the main part of a transmission illumination microscope according to the seventh embodiment of the present invention.

FIG. 13 shows only the main part of a schematic arrangement in the seventh embodiment of the present invention. The seventh embodiment is a modification of part of the sixth embodiment, and only the modified part and its periphery are illustrated. The same reference numerals as in the sixth embodiment denote the same parts, and a detailed description thereof will be omitted.

In FIG. 13, a semi-transmission reflecting prism (half-prism) 1163a replaces the semi-transmission reflecting member 1163 in the sixth embodiment. An incident surface 1163b of the semi-transmission reflecting prism on an LED light source 1003 side serves as the light-transmitting dustproof member 1052. The light-transmitting dustproof member need not be separately arranged, so that a low-cost coaxial incident-light illumination microscope which is easily assembled can be provided.

Note that the present invention is not limited to the above embodiments, and can be variously modified within the spirit and scope of the invention in practice. The embodiments may be properly combined as much as possible. In this case, combined effects can be attained. The embodiments include the inventions of various stages, and various inventions can be extracted by proper combinations of a plurality of disclosed building components. For example, when an invention is extracted by omitting several building components from all the building components described in the embodiments, the omitted part is appropriately compensated by a known conventional technique in practicing the extracted invention.

For example, a mechanical shutter mechanism described in the fifth to seventh embodiments may be assembled in a microscope described in the first to fourth embodiments.

The above embodiments include the following inventions.

(1) A microscope is characterized by comprising:
an LED light source;
a stage for placing a specimen irradiated with light from the LED light source;
a lens barrel which is arranged to face the specimen on the stage, and has an observation optical system for acquiring the observation image of the specimen;
an image sensing element which is arranged at the imaging position of the observation optical system of the lens barrel, and senses the observation image of the specimen;
an electrical processing unit for processing an output signal from the image sensing element;
a monitor for displaying image data of the observation image output from the electrical processing unit; and
a recording means for recording the image data of the observation image,
wherein the LED light source, stage, lens barrel, and image sensing element are linearly aligned, and the electrical processing unit is arranged behind the lens barrel.

(2) In the microscope described in (1), the observation optical system is rotatably attached to the lens barrel, and the observation magnification can be switched by pivoting the observation optical system.

(3) The microscope described in (1) further comprises a support member which stands almost upright, and the LED light source, stage, lens barrel, and image sensing element are supported along the support member.

(4) A transmission illumination microscope is characterized by comprising:
a light source;
a stage for placing a specimen irradiated with illumination light from the light source;
an imaging optical system which is arranged to face the specimen on the stage, and acquires the observation image of the specimen;
an image sensing element arranged at the imaging position of the imaging optical system;
a control unit for controlling the image sensing element; and
a shutter mechanism which is arranged between the light source and the stage, and shields incident light on the image sensing element in synchronism with the image sensing timing of the image sensing element controlled by the control unit.

(5) A coaxial incident-light illumination microscope is characterized by comprising:
a light source;
a stage for placing a specimen irradiated with illumination light from the light source;
an imaging optical system which is arranged to face the specimen on the stage, and acquires the observation image of the specimen;
an image sensing element arranged at the imaging position of the imaging optical system;
a control unit for controlling the image sensing element;
a semi-transmission reflecting member for irradiating the specimen with illumination light from the light source coaxially with the imaging optical system;
a light-transmitting dustproof member interposed between the light source and the semi-transmission reflecting member; and
a shutter mechanism which is arranged between the light source and the light-transmitting dustproof member, and shields incident light on the image sensing element in synchronism with the image sensing timing of the image sensing element controlled by the control unit.

(6) In the coaxial incident-light illumination microscope described in (5), the semi-transmission reflecting member is a semi-transmission reflecting prism, and one surface of the semi-transmission reflecting prism serves as the light-transmitting dustproof member.

(7) In the microscope described in (4) or (5), the shutter mechanism is fixed via a vibration absorption member.

Each embodiment has exemplified the use of a mechanical shutter as a shutter mechanism for shielding illumination light. However, the shutter mechanism may be another shutter mechanism such as a liquid crystal shutter. For example, when a liquid crystal shutter is employed as a shutter mechanism, no wear powder is generated upon the operation of the shutter, but the liquid crystal shutter is assembled similarly to the mechanical shutter. Thus, the present invention exhibits effects on another shutter mechanism such as the liquid crystal shutter, and an application of such a shutter mechanism also falls within the spirit and scope of the present invention.

As has been described above, the present invention can provide a compact, space-saving microscope which facilitates observation and operation.

The present invention can further provide a low-cost microscope capable of photographing a high-quality image without any image degradation or any assembly problem caused by arranging a shutter mechanism on an imaging optical system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:

an LED light source;

a stage for placing a specimen irradiated with light from said LED light source;

a lens barrel which faces the specimen on said stage, and which includes an observation optical system for acquiring an observation image of the specimen;

an image sensing element provided at an imaging position of the observation optical system of said lens barrel, and which senses the observation image of the specimen;

an electrical processing unit for processing an output signal from said image sensing element;

a monitor for displaying image data of the observation image output from said electrical processing unit;

a control unit for controlling an image sensing timing of said image sensing element;

a shutter mechanism disposed along an optical path between said LED light source and the specimen, which shields incident light on said image sensing element in synchronism with an image sensing timing of said image sensing element controlled by said control unit;

a semi-transmission reflecting member for irradiating the specimen with illumination light from said LED light source coaxially with the observation optical system; and a light-transmitting dustproof member interposed between said LED light source and said semi-transmission reflecting member, wherein said shutter mechanism includes a mechanical shutter interposed between said LED light source and said light-transmitting dustproof member.

2. A microscope comprising:

a light source;

a stage for placing a specimen irradiated with light from said light source; an imaging optical system which faces the specimen on said stage, and acquires an observation image of the specimen;

an image sensing element provided at an imaging position of said imaging optical system;

a control unit for controlling said image sensing element;

a shutter mechanism disposed along an optical path between said light source and the specimen, and which shields incident light on said image sensing element in synchronism with an image sensing timing of said image sensing element controlled by said control unit;

a semi-transmission reflecting member for irradiating the specimen with illumination light from said eight source coaxially with the observation optical system; and a light-transmitting dustproof member interposed between said light source and said semi-transmission reflecting member, wherein said shutter mechanism includes a mechanical shutter interposed between said light source and said light-transmitting dustproof member.

3. A microscope comprising:

a light source;

a stage for placing a specimen irradiated with light from said light source;

a lens barrel which faces the specimen on said stage, and which includes an observation optical system for acquiring an observation image of the specimen;

an image sensing element provided at an imaging position of said observation optical system of said lens barrel that senses the observation image of the specimen;

an electrical processing unit for processing an output signal from said image sensing element;

a monitor for displaying image data of the observation image output from said electrical processing unit;

a base disposed on a surface of a desk;

a support member which stands substantially upright on said base;

a substantially cylindrical cover which covers said light source, said stage, said observation optical system, said lens barrel, said image sensing element, said electrical processing unit, and said support member;

recording means for recording the image data of the observation image;

zooming lenses provided in said observation optical system, and which rotate to change an observation magnification of the microscope; and a zooming handle which projects from a side surface of said substantially cylindrical cover, for rotating said zooming lenses, wherein said light source, said stage, said lens barrel, and said image sensing element are arranged in a substantially vertical line within said substantially cylindrical cover, an opening for insertion/removal of the specimen and a display surface of said monitor are provided in the side surface of said substantially cylindrical cover, and said recording means is detachably provided on an upper surface of said substantially cylindrical cover.

4. A microscope comprising:

a light source;

a stage for placing a specimen irradiated with light from said light source;

a lens barrel which faces the specimen on said stage, and which includes an observation optical system for acquiring an observation image of the specimen;

an image sensing element provided at an imaging position of the observation optical system of said lens barrel that senses the observation image of the specimen;

an electrical processing unit which processes an output signal from said image sensing element;

a monitor for displaying image data of the observation image output from said electrical processing unit;

a base disposed on a surface of a desk;

a support member which stands substantially upright on the base; and a substantially cylindrical cover which covers said light source, said stage, said observation optical system, said lens barrel, said image sensing element, said electrical processing unit, and said support member, wherein said light source, said stage, said lens barrel, and said image sensing element are arranged in a substantially vertical line within said substantially cylindrical cover, and an opening for insertion/removal of the specimen and a display surface of said monitor are provided in the side surface of said substantially cylindrical cover.

5. A microscope according to claim 4, further comprising recording means for recording the image data of the observation image, said recording means being detachably provided on an upper surface of said cover.

6. A microscope according to claim 4, further comprising:
zooming lenses provided in said observation optical system, and which rotate to change an observation magnification of the microscope; and
a zooming handle which projects from the side surface of said substantially cylindrical cover, for rotating said zooming lenses.

7. A microscope according to claim 4, further comprising:
a focusing mechanism provided in said support member, which moves said stage in a vertical direction; and
a focusing handle projected from the side surface of said cover, which operates said focusing mechanism,
wherein said focusing mechanism and said focusing handle are operated to focus the microscope on the specimen.

8. A microscope according to claim 4, further comprising a switch operation section provided on a side surface of said substantially cylindrical cover in which said monitor is located, the switch operation section comprising at least a switch for turning on and off a power source for said light source and said image sensing element, and a switch for turning said monitor on and off.

9. A microscope according to claims 4, wherein the opening and monitor are provided on a side of the microscope and wherein heights of positions of the opening and monitor with respect to said stage are different from each other.

* * * * *